Figure 2:
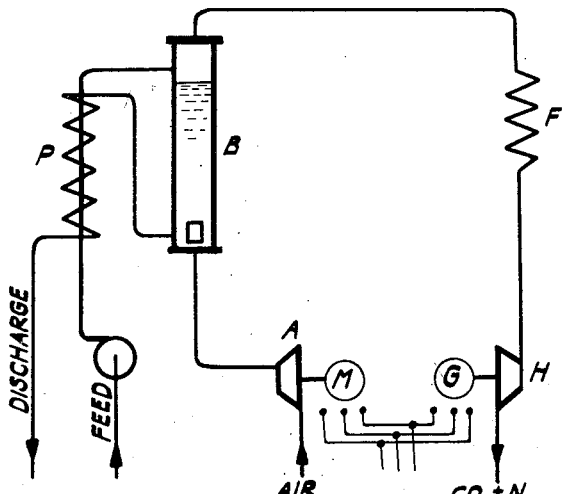

Dec. 4, 1956  K. N. CEDERQUIST  2,773,026
REMOVAL OF DISSOLVED OR DISPERSED ORGANIC MATERIAL
FROM AQUEOUS SOLUTIONS AND SUSPENSIONS
Filed July 2, 1953

A COMPRESSOR
B OXIDATION VESSEL
C HEAT EXCHANGER
D PREHEATER
F SUPERHEATER
H EXPANSION MACHINE
G GENERATOR EL.
M MOTOR EL.
P PREHEATER

INVENTOR:
KARL NICOLAUS CEDERQUIST
BY Howson & Howson
ATTYS.

United States Patent Office 2,773,026
Patented Dec. 4, 1956

2,773,026

REMOVAL OF DISSOLVED OR DISPERSED ORGANIC MATERIAL FROM AQUEOUS SOLUTIONS AND SUSPENSIONS

Karl Nicolaus Cederquist, Falun, Sweden, assignor to Stora Kopparbergs Bergslags Aktiebolag, Falun, Sweden, a joint-stock company limited of Sweden Application July 2, 1953, Serial No. 365,755

7 Claims. (Cl. 210—2)

The present invention relates to and has for its object an improved method to remove organic material dissolved or dispersed in water by oxidation with molecular oxygen mainly to carbon dioxide at elevated temperature and pressure.

The process may be carried through batchwise but it is preferably performed continuously and under all circumstances the oxygen gas required and the carbon dioxide formed have to be respectively supplied and drawn off continuously.

The organic material can be of different origin and constitution, e. g. lignocellulosic material such as peat, peat-moss, wood extracts and lignin or sugars, proteins and other organic materials and the concentration can vary between wide limits, e. g. 3–30%. Particularly the process is of interest for treating waste waters and waste liquors containing organic matters such as waste liquors from pulping, Masonite processing, sugar refining, spent wash from distilleries and yeast factories. That kind of contaminations can easily be removed from the waters or liquors to prevent stream pollution and undesirable decomposition by biological processes.

The inventor has found by investigations that it is possible to break down organic matters in water solutions or suspensions of the composition mentioned above into carbon dioxide and water at elevated temperature and pressure by introducing oxygen containing gases into the water.

Above a temperature of 170–180° C. the speed of reaction is fairly high and the method can be used for a continuous "combustion" of organic matters directly in the water and the heat evolved can easily be utilized for carrying out the process without supply of additional heat by the choice of a suitable partial pressure of the non-condensable gases. Under certain conditions for example in case of low concentration of organic material in the solution or suspension to be treated it might be necessary to preheat the entering liquid. The formed steam-saturated "flue gases" can be used for heating purposes and power production.

The temperature necessary for carrying through the complete reaction depends on the nature of the organic material dissolved or dispersed in the water. For example in peat and peat-moss slurries and waste water from the Masonite-processing containing 5–10% organic matter most of said matter can be oxidized to carbon dioxide rapidly at a temperature of 170–200° C. Waste liquors from sulphite cooking of wood preferably is oxidized at a temperature of 210–230° C. at which temperature a practical speed of reaction is obtained.

The total pressure of steam and non-condensable gas in the pressure system must be balanced in such a way that the heat of the steam leaving the pressure system and mixed with the non-condensable gas corresponds to the excess of heat evolved in the process. The total pressure must be essentially higher than the steam pressure corresponding to the temperature of reaction. At a temperature of 185° C. a pressure of 25–50 kgs./sq. cm. (350–700 pounds per square inch) has been used and at a temperature of 225° C. a pressure of 40–100 kgs./sq. cm. (570–1420 pounds per square inch).

To control the reaction it is suitable to maintain the total pressure constant allowing the temperature to vary. It is also possible to maintain both pressure and temperature constant by varying the concentration of oxygen in the gases introduced in the water solution.

In a test run on waste water from the Masonite process containing 5% dissolved organic matters approximately 80% of the organic matters were decomposed to carbon dioxide by using 320 kgs. of air per cubic meter of entering solution. The total pressure was 26 kgs. per sq. cm. (370 pounds per square inch) absolute. At a temperature of 140° C. on the entering solution the evolved heat maintained a temperature in the reaction vessel of approximately 190° C. which corresponds to 0.6 kg. of steam per kg. of non-condensable gas leaving the pressure vessel. If for some reasons the temperature of the entering solution would drop, less heat can be removed as steam and at constant total pressure the temperature will drop which means less temperature and less steam in the escaping non-condensable gas. The temperature will drop until the heat in the steam-gas mixture corresponds to the excess of heat evolved in the process.

By oxidation of organic matters of the origin mentioned above small amounts of organic acids often are formed such as formic and acetic acid and non-volatile oxycarboxylic acid which in some cases may be neutralized by introducing caustic soda, sodium carbonate, lime stone powder or lime to prevent severe corrosion in the pressure system and the steam-gas system.

For example by total oxidation of the above mentioned waste water from the Masonite process by using air at a temperature of 185° C., 60–84% of the carbon of the organic matters were transformed to carbon dioxide depending on conditions such as time of reaction and quantity of air used, and 10–12% to volatile acids. The balance remains in the solution as non-volatile acids and other highly oxidized compounds and small amounts of precipitated insoluble carbonous matters.

When oxidizing sulphite waste liquors by air usually a temperature of 215–225° C. and a total steam-gas pressure of approximately 40 kgs./sq. cm. (570 pounds per square inch) must be used to obtain an applicable combustion process. Under these conditions 60–65% of the soluble organic matters in the liquor can be precipitated, if the combustion process is interrupted when 20–25% of the organic matters present have been completely oxidized to carbon dioxide and water. The carbonous matters precipitated can be separated from the water by centrifugating leaving a filter cake which approximately contains 75% dry substance and can directly be used as fuel. It can be of advantage to remove the precipitated carbonous matters by mechanical means to decrease the consumption of compressed oxygen or air and still remove the organic matters from the liquor.

In another experiment a calcium sulphite liquor from the production of strong pulp containing 10% dissolved matters has yielded per ton of soluble dry substance at a temperature of 225° C. and a pressure of 40 kgs./sq. cm. 600 kgs. of precipitated carbonous matters (dry base) and 1,500 kgs. low pressure steam of 1.3 kgs./sq. cm. (18.5 pounds per square inch) by heat exchange of the escaping gas-steam mixture. 150 kgs. dry substance remain in solution as highly oxidized organic compounds. Approximately 85% of the heating value of the dissolved material in the liquor is recovered as solid fuel and steam.

To carry through that kind of oxidation requires a high consumption of power for compressing air or other oxygen containing gases. To decrease the costs of compression and to make the process economical it is necessary to supply oxygen and to draw off the steam-gas mixture continuously thus making possible an expansion of the leaving steam-gas mixture in a gas turbine or a screw expansion machinery for power production.

The non-condensable gases leaving the oxidation unit are mixed with steam and the utilization of the steam-gas mixture can be done in different ways depending on local conditions. The steam-gas mixture can directly be used in an expansion machinery preferably after super-heating under presure or the steam in the mixture can previously be removed by cooling the mixture in a heat exchanger under pressure and the resulting non-condensable gases used in an expansion machinery after super-heating.

In the following two examples of how the invention can be carried out into practice will be described, reference being made to the accompanying drawing which shows two flow sheets. It will be understood that the invention is not restricted in any way by said examples which only illustrate the principles of the novel process.

*Example 1*

Figure 1:
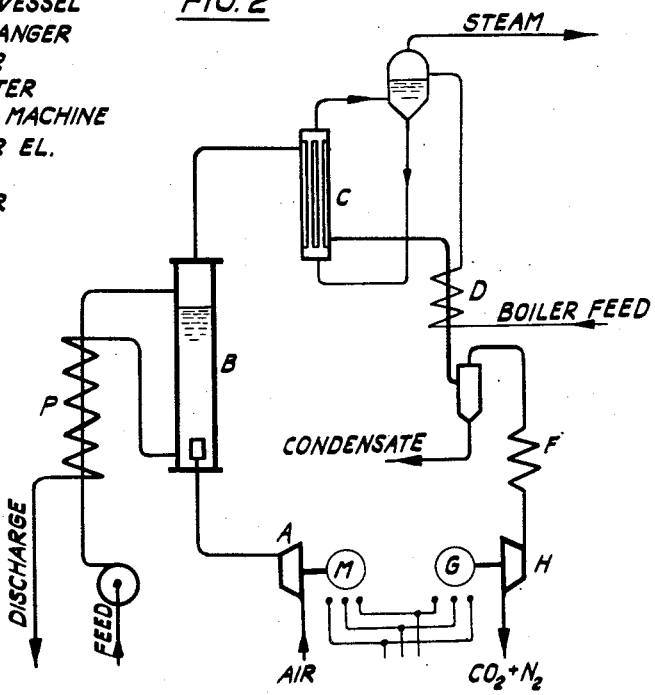

In a continuous oxidation process of a water solution containing 10% soluble carbohydrates and lignin, working at a temperature of about 185° C. and a total steam gas pressure of about 26 kgs./sq. cm. (about 370 pounds per square inch), the consumption of compressed air is 0.539 kg. per second and the escaping steam-gas mixture amounts to 0.572 kg. per second of non-condensable gas and 0.266 kg. per second of steam. Referring to Figure 1 the air is compressed in a 2-stage screw compressor A and distributed in the hot liquid in the pressure vessel B by means of a nozzle. The escaping steam gas mixture is cooled under 26 kgs./sq. cm. pressure in the heat exchanger C producing hot water or low pressure steam, and the remaining non-condensable gas is superheated to 650° C. under the same pressure in F and expanded through a 2-stage expansion machine H. The compression of the air requires 330 H. P. and in the expansion machinery it is developed 370 H. P. which is enough for running the air compressor including energy losses. The energy necessary for the compression amounts only to the heat required for heating the non-condensable gases to 650° C.

*Example 2*

The equipment used in this case is shown by Figure 2 of the drawing and corresponds to the one used in Example 1 except the steam generation system C, D which involves superheating the total steam-gas mixture to 650° C. and expanding it through the expansion machine H, whereby an excess of 340 H. P. is developed.

If the oxidation unit is connected to a gas turbine system with a closed gas cycle, compressed air can be drawn off from the air compressor connected to the gas turbine and compressed further in a separate air compressor and fed to the oxidation unit. Escaping steam-gas mixture from the oxidation unit passes an expansion running with a back-pressure equal to the pressure after the air compressor of the gas turbine and recycled to the gas turbine system for superheating and expansion in the gas turbine. The air for carrying through the oxidation is in this case borrowed from the gas turbine system and recycled as a carbon-dioxide-rich steam-gas mixture. The steam in the steam-gas mixture can be condensed in a heat exchanger before the gas is recycled to the gas turbine.

In all cases where solid carbonous matter is formed by the oxidation it is possible to decrease the consumption of oxygen gas by mechanically separating said matter from the solution or suspension after the oxidation. Also in such cases where organic materials remain in the solution after the oxidation process, said products are so highly oxidized that the products cannot undergo biological processes, that making it possible to discharge the solution into the streams without any risk of water pollution.

Having now particularly described and ascertained the nature of my said invention and which manner the same is to be performed, I declare that what I claim is:

1. A method of removing organic material from a waste liquor derived from a pulping process which comprises treating said waste liquor at elevated temperature and pressure with oxygen-containing gases in order to effect combustion within said liquor utilizing heat liberated in the combustion in order to carry out the pressure treatment, and allowing said combustion to continue at least to the stage at which substantially the remaining organic substance forms an insoluble carbonous residue in the liquor.

2. The method of claim 1, wherein the pressure treatment is effected at a temperature above about 180° C.

3. The method of claim 2, wherein the pressure treatment is effected at a temperature between about 210° and about 230° C.

4. The method of claim 1 wherein the pressure treatment is effected at a pressure of at least about 350 pounds per square inch.

5. A method for precipitating solid materials from a waste liquor deriving from a pulping process which comprises treating the waste liquor at elevated temperature and pressure with oxygen-containing gases in order to effect a combustion within said liquor utilizing heat liberated in the combustion in order to maintain necessary conditions as to temperature and pressure, and controlling said combustion so as to combust substantially at least 25% of the organic material of the waste liquor to form a solid carbonous residue in the treated liquor representing substantially the remaining organic material.

6. The method of claim 5, wherein the process is effected at a temperature of at least about 180° C.

7. The method of claim 6, wherein the process is effected at a pressure of at least about 350 pounds per square inch.

References Cited in the file of this patent
UNITED STATES PATENTS

| | | |
|---|---|---|
| 1,149,420 | Strehlenert | Aug. 10, 1915 |
| 1,268,774 | Soraas | June 4, 1918 |
| 2,258,401 | Badenhausen | Oct. 7, 1941 |
| 2,665,249 | Zimmermann | Jan. 5, 1954 |